(12) United States Patent
Xue et al.

(10) Patent No.: US 8,457,038 B1
(45) Date of Patent: Jun. 4, 2013

(54) VELOCITY BASED HANDOFF DETERMINATION IN WIRELESS COMMUNICATION SYSTEM

(75) Inventors: Wen Xue, Overland Park, KS (US); Talat Jamshidi, Leawood, KS (US); Jay Douglas Cole, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 395 days.

(21) Appl. No.: 12/913,055

(22) Filed: Oct. 27, 2010

(51) Int. Cl.
*H04B 7/185* (2006.01)
*H04B 7/005* (2006.01)
*H04W 4/00* (2009.01)
*H04W 36/00* (2009.01)

(52) U.S. Cl.
USPC .......... 370/318; 370/332; 370/338; 455/13.4; 455/441; 455/522

(58) Field of Classification Search
USPC ................. 370/310–350; 455/13.4, 431–444, 455/456.1–465, 522
See application file for complete search history.

(56) References Cited

U.S. PATENT DOCUMENTS

| | | | |
|---|---|---|---|
| 5,329,635 A | 7/1994 | Wadin et al. | |
| 5,436,956 A | 7/1995 | Shiotsuki et al. | |
| 5,450,473 A | 9/1995 | Shiotsuki et al. | |
| 5,548,808 A * | 8/1996 | Bruckert et al. | 455/442 |
| 5,579,373 A * | 11/1996 | Jang | 455/436 |
| 5,924,043 A * | 7/1999 | Takano | 455/522 |
| 6,073,025 A * | 6/2000 | Chheda et al. | 455/522 |
| 6,456,827 B1 * | 9/2002 | Kubo et al. | 455/68 |
| 6,487,409 B2 | 11/2002 | Qing-An | |
| 6,507,740 B2 | 1/2003 | Shi | |
| 6,714,789 B1 | 3/2004 | Oh et al. | |
| 6,745,034 B2 | 6/2004 | Wang et al. | |
| 6,907,243 B1 | 6/2005 | Patel | |
| 7,076,245 B1 | 7/2006 | Satapathy | |
| 7,089,007 B2 | 8/2006 | Wakuta et al. | |
| 7,092,722 B1 | 8/2006 | Oh et al. | |
| 7,200,127 B1 * | 4/2007 | Lee et al. | 370/335 |
| 7,206,579 B2 | 4/2007 | Gwon et al. | |
| 7,313,113 B1 * | 12/2007 | Hills et al. | 370/332 |
| 7,693,518 B2 | 4/2010 | Miyata | |
| 2002/0102977 A1 | 8/2002 | Shi | |
| 2003/0119508 A1 | 6/2003 | Gwon et al. | |
| 2005/0221828 A1 | 10/2005 | Wakuta et al. | |
| 2006/0109820 A1 | 5/2006 | Miyata | |
| 2008/0070576 A1 | 3/2008 | Sanders et al. | |
| 2010/0056157 A1 | 3/2010 | Verona et al. | |

* cited by examiner

*Primary Examiner* — Tri H Phan (57) ABSTRACT

Embodiments disclosed herein provide systems and methods for adjusting access node scanning based on the velocity of a wireless communication device. In a particular embodiment, a method provides scanning for a first wireless access node to determine a received power level and comparing the received power level to a threshold power level. If the received power level exceeds the threshold, the method provides exchanging communications with the first wireless access node. The method further provides determining a velocity of the wireless device and adjusting the threshold power level based on the velocity. The method further provides scanning for a second wireless access node to determine a second received power level and comparing the second received power level to the adjusted threshold power level. If the second received power level exceeds the adjusted threshold, the method provides exchanging communications with the second wireless access node.

20 Claims, 8 Drawing Sheets

| BASE STATION POWER LEVEL THRESHOLDS | | | |
|---|---|---|---|
| Velocity (MPH) | Scan Threshold (dBm) | Entry Threshold (dBm) | Handoff Threshold (dBm) |
| 0 | -90 | -65 | -120 |
| 0-10 | -80 | -75 | -110 |
| 10-20 | -70 | -85 | -100 |
| >20 | -60 | -95 | -90 |

| WIFI POWER LEVEL THRESHOLDS | | | |
| --- | --- | --- | --- |
| Velocity | Scan Threshold | Entry Threshold | Handoff Threshold |
| 0 | -90 | -65 | -120 |
| 0-10 | -80 | -75 | -110 |
| 10-20 | NONE | NONE | NONE |
| >20 | NONE | NONE | NONE |

VELOCITY BASED HANDOFF DETERMINATION IN WIRELESS COMMUNICATION SYSTEM

TECHNICAL BACKGROUND

Wireless communication devices, such as cellular phones, use wireless communication networks to communicate with other communication devices and systems. There exist many different protocols that wireless communication devices and wireless communication networks may use in order to communicate with each other. A wireless communication network includes one or more wireless access nodes that exchange wireless communications with a wireless communication device. Multiple access nodes allow a wireless communication device to communicate with a wireless communication network in more locations than would otherwise be possible with one wireless access node.

Additionally, multiple wireless access nodes may allow a wireless communication device to move from a location covered by one wireless access node to a location covered by another wireless access node without losing wireless connectivity with the wireless communication network. The process of transferring wireless communications of a wireless communication device from one access node to another is typically called handing off. While a wireless device moves from one location to another, the decision to hand off to alternative wireless access nodes may be determined based on the received power levels of the wireless signal from the wireless access nodes.

OVERVIEW

Embodiments disclosed herein provide systems and methods for adjusting access node scanning based on the velocity of a wireless communication device. In a particular embodiment, a method provides scanning for a first wireless access node to determine a received power level for the first access node and comparing the received power level to a threshold power level. If the received power level is greater than the threshold power level, the method provides exchanging communications with the first wireless access node. The method further provides determining a velocity of the wireless communication device and adjusting the threshold power level based on the velocity. The method further provides scanning for a second wireless access node to determine a second received power level for the second access node and comparing the second received power level to the adjusted threshold power level. If the second received power level is greater than the adjusted threshold power level, the method provides exchanging communications with the second wireless access node.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
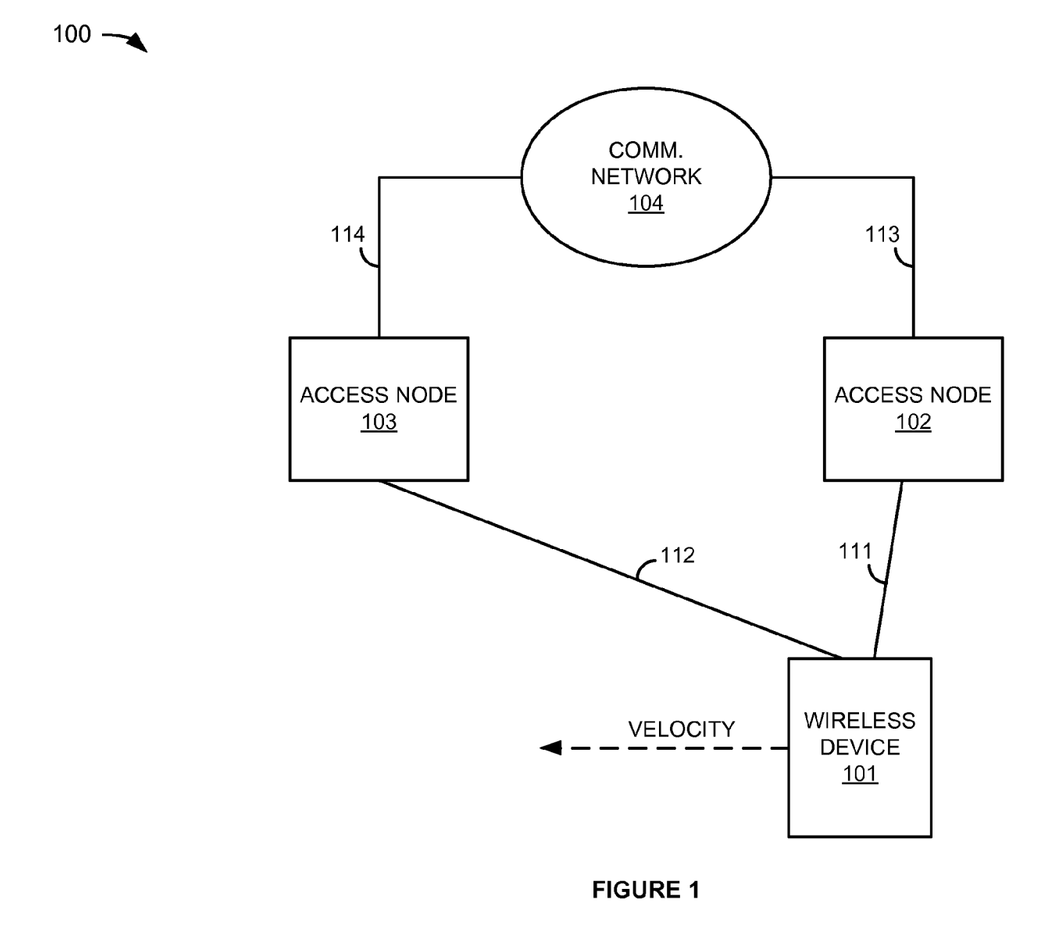
FIG. 1 illustrates a wireless communication system.

FIG. 1 illustrates wireless communication system 100. Wireless communication system 100 includes wireless communication device 101, wireless access node 102, wireless access node 103, and communication network 104. Wireless communication device 101 and wireless access node 102 communicate over wireless link 111. Wireless device 101 and wireless access node 103 communicate over wireless link 112. Access node 102 and communication network 104 communicate over communication link 113. Access node 103 and communication network 104 communicate over communication link 114.

In operation, wireless device 101 is capable of exchanging wireless communications with access nodes 102 and 103. Before communications can be exchanged between wireless device 101 and an access node, wireless device must first scan for available access nodes. Access nodes, such as access nodes 102 and 103 each broadcasts a signal, sometimes referred to as a pilot signal. Wireless device 101 may recognize a signal from an access node and determine whether wireless device 101 should communicate with the access node.

Wireless device 101 may determine whether wireless device 101 should communicate with an access node by assessing the power level of the received signal from the access node. The received power level may be compared with a threshold power level to determine whether the received signal strength from the access node is at a power level great enough to sustain communications with wireless device 101. If the received power level is great enough, wireless device 101 may connect to the access node to exchange communications. Similarly, if wireless device 101 detects multiple access nodes provide wireless device 101 with a received power level greater than the threshold, then wireless device 101 may choose to connect to the access node with the greatest received power level or may us some other way of determining to which access node wireless device 101 should connect.

Figure 2:
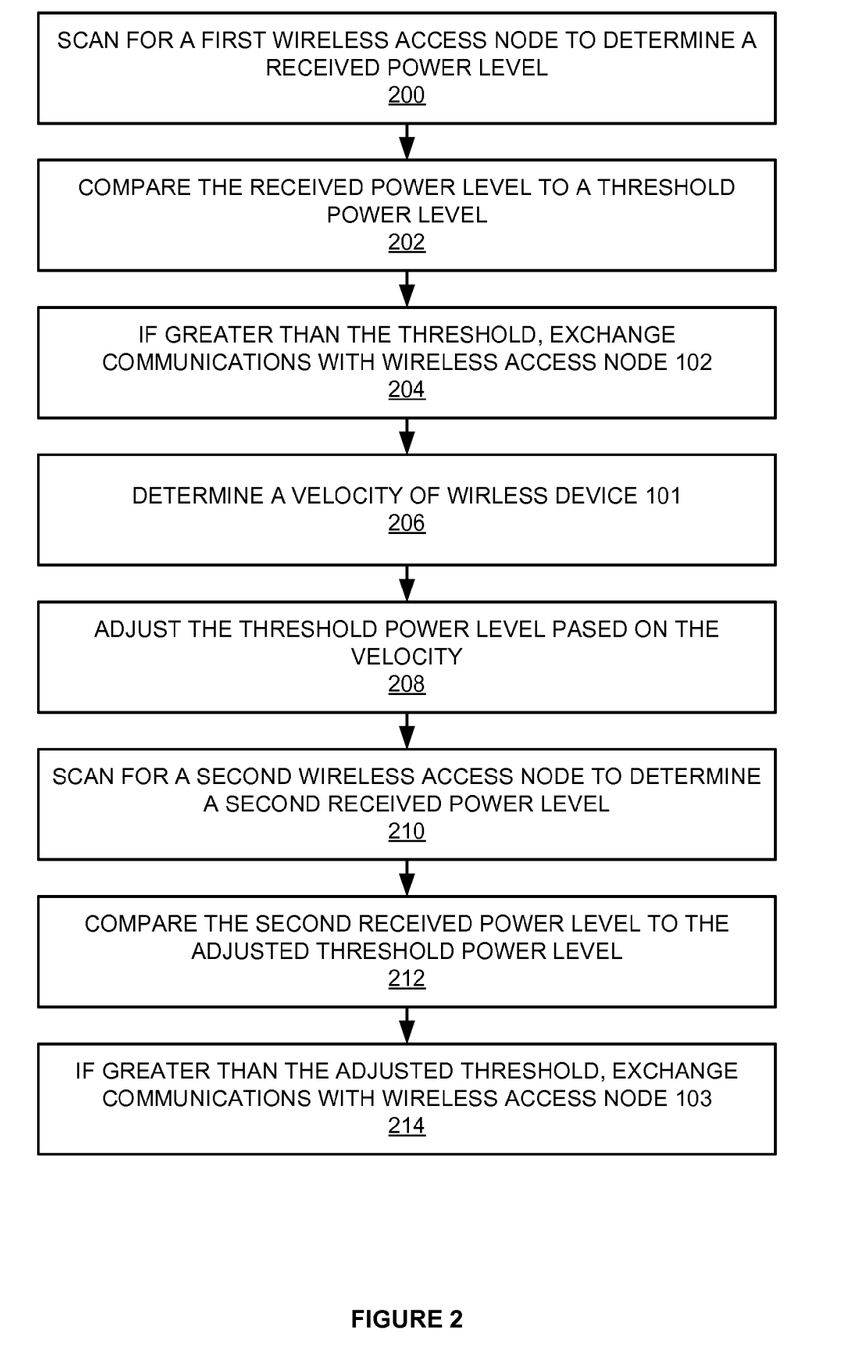
FIG. 2 illustrates the operation of a wireless communication system.

FIG. 2 illustrates the operation of wireless communication system 100. Wireless device 101 scans for a first wireless access node to determine a received power level for the first access node (step 200). Both wireless access node 102 and 103 are transmitting a signal identifying each access node to wireless devices within range of the signal. Access nodes 102 and 103 may be part of the same communication network 104, as illustrated in FIG. 1, or each may be part of different wireless communication networks and use different wireless communication protocols. In this example, wireless device 101 finds at least access node 102 as a result of the scan and determines a received power level for the signal from access node 102. Wireless device 101 compares the received power level to a threshold power level (step 202). The threshold power level may be stored in a data structure on wireless device 101 along with other thresholds that wireless device 101 may operate. If the received power level is greater than the threshold power level, wireless device 101 exchanges communications with wireless access node 102 (step 204).

If the received power lever is lower than the threshold power level, then wireless device 101 may connect with another access node with a received signal power level greater than the threshold. Alternatively, if none of the received power levels from access nodes that wireless device 101 finds during the scan is greater than the threshold, then wireless device 101 may choose to connect with the access node having the greatest received power level or may continue communicating with an access node to which wireless device 101 is currently communicating.

Wireless device 101 then determines a velocity of wireless device 101 (step 206). Wireless device 101 may determine the velocity of wireless device 101 using the global positioning system (GPS), accelerometers, wireless access node tri-lateration, network assisted positioning, user input of approximate velocity or activity, such as walking, biking, or driving, or any other way of determining the velocity of a wireless device. Wireless device 101 may store the velocity in a storage system for future reference along with one or more past velocities of wireless device 101.

After determining the velocity, wireless device 101 adjusts the threshold power level based on the velocity (step 208). The threshold power level may be lowered for higher velocities, raised for lower velocities, and kept constant for constant velocities. Wireless device 101 may determine the appropriate threshold adjustment based on a table, or other data structure, listing threshold levels corresponding to various velocities. The threshold table may further be divided into threshold levels corresponding to access node protocol in addition to velocity. Therefore, the threshold power level may be different between access nodes 102 and 103 if access nodes 102 and 103 use different wireless protocols. Additionally, the threshold value may be changed based on a change in velocity rather than the absolute value of the velocity. Therefore, wireless device 101 may compare the velocity to a previous velocity to determine a velocity differential. The power level threshold may then be adjusted based on the velocity differential. For example, if the velocity increases then the threshold may be decreased a corresponding amount.

Wireless device 101 then scans for a second wireless access node to determine a second received power level for the second access node (step 210). In this example, the velocity of wireless device 101 is in the direction of access node 103. Therefore, wireless device 101 finds at least access node 103 during the scan. Wireless device 101 compares the second received power level to the adjusted threshold power level (step 212). If the second received power level is greater than the adjusted threshold power level, wireless device 101 exchanges communications with access node 103 (step 214).

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access nodes 102 and 103 each comprise RF communication circuitry and an antenna. The RF communication circuitry typically includes an amplifier, filter, RF modulator, and signal processing circuitry. Wireless access nodes 102 and 103 may also comprise a router, server, memory device, software, processing circuitry, cabling, power supply, network communication interface, structural support, or some other communication apparatus. Wireless access nodes 102 and 103 each could be a base station, Internet access node, telephony service node, wireless data access point, or some other wireless communication system—including combinations thereof.

Communication network 104 is a communication network that comprises telephony switches, wireless access nodes, such as access nodes 102 and 103, Internet routers, network gateways, computer systems, communication links, or some other type of communication equipment—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 113-114 use metal, glass, air, space, or some other material as the transport media. Communication links 113-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 113-114 could be direct links or may include intermediate networks, systems, or devices.

Figure 3:
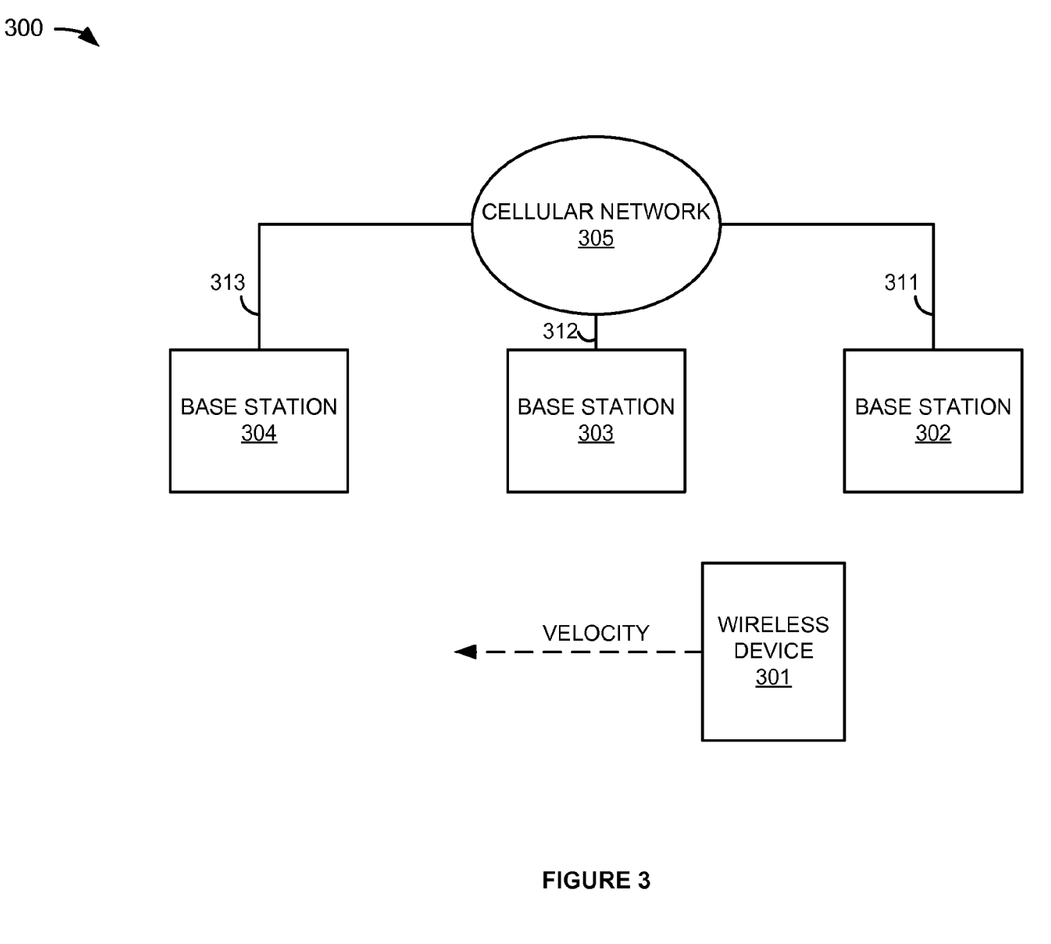
FIG. 3 illustrates a wireless communication system.

FIG. 3 illustrates wireless communication system 300. Wireless communication system 300 includes wireless device 301, base stations 302-304, and cellular network 305. Base station 302 and cellular network 305 communicate over communication link 311. Base station 303 and cellular network 305 communicate over communication link 312. Base station 304 and cellular network 305 communicate over communication link 313. Wireless device 301 is capable of communicating with base stations 302-304 over wireless links similar to those described in FIG. 1.

Figure 4:
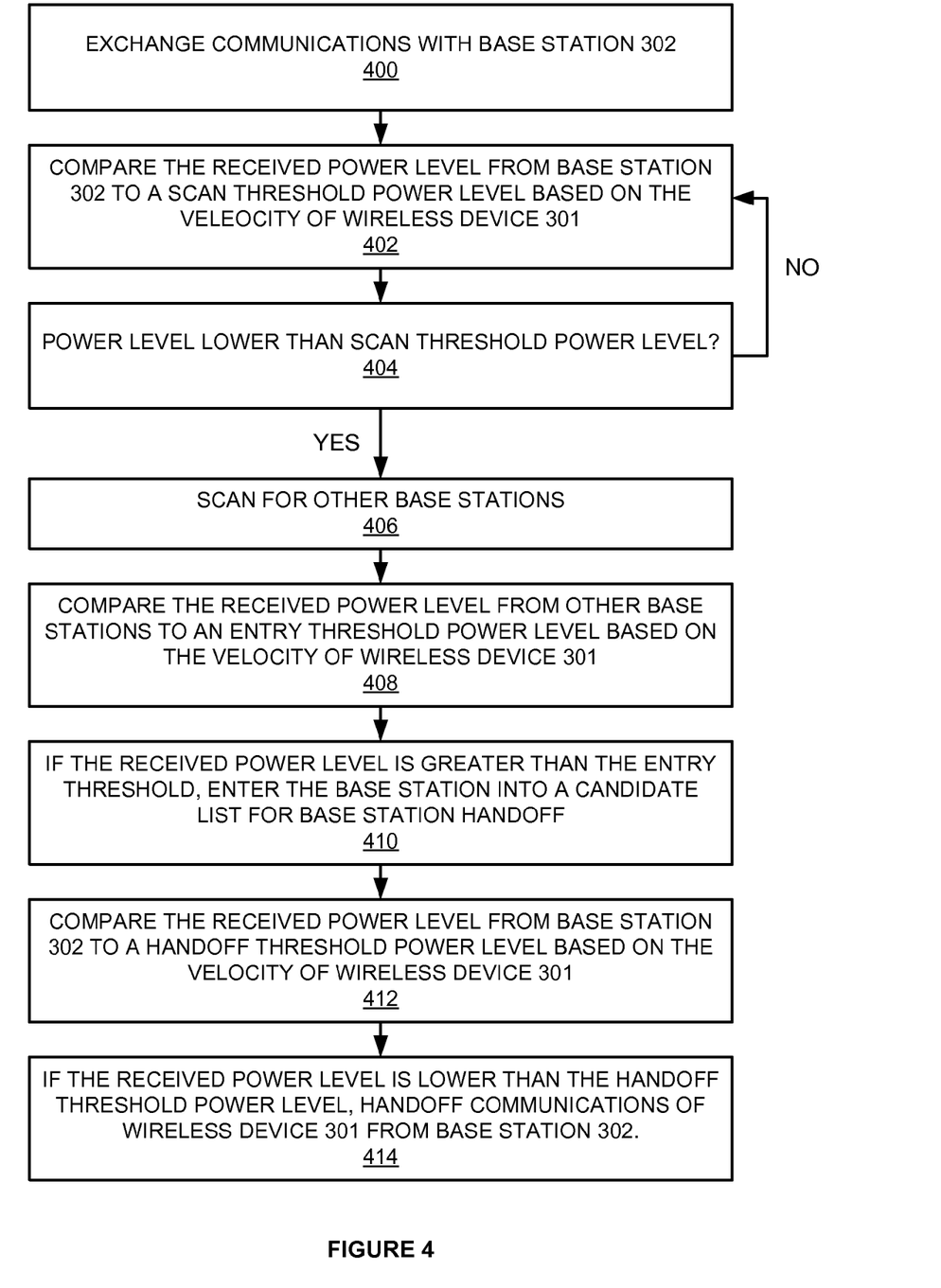
FIG. 4 illustrates the operation of a wireless communication system.

FIG. 4 illustrates the operation of wireless communication system 300. This example begins with wireless device 301 already exchanging communications with base station 302 of cellular network 305 (step 400). As wireless device 301 moves locations base stations 303 and 304 may be better suited for exchanging communications with wireless device 301. Therefore, wireless device 301 performs procedures necessary to determine whether wireless device should transfer communications to either of base stations 303 or 304. The process of transferring communications to another base station is commonly referred to as handing off.

While exchanging communications with base station 302, wireless device 301 determines a velocity of wireless device 301. Wireless device 301 also determines the received power level of communications received from base station 302. Wireless device 301 then compares the received power level from base station 302 to a scan threshold power level based on the velocity of wireless device 301 (step 402).

Figure 5:
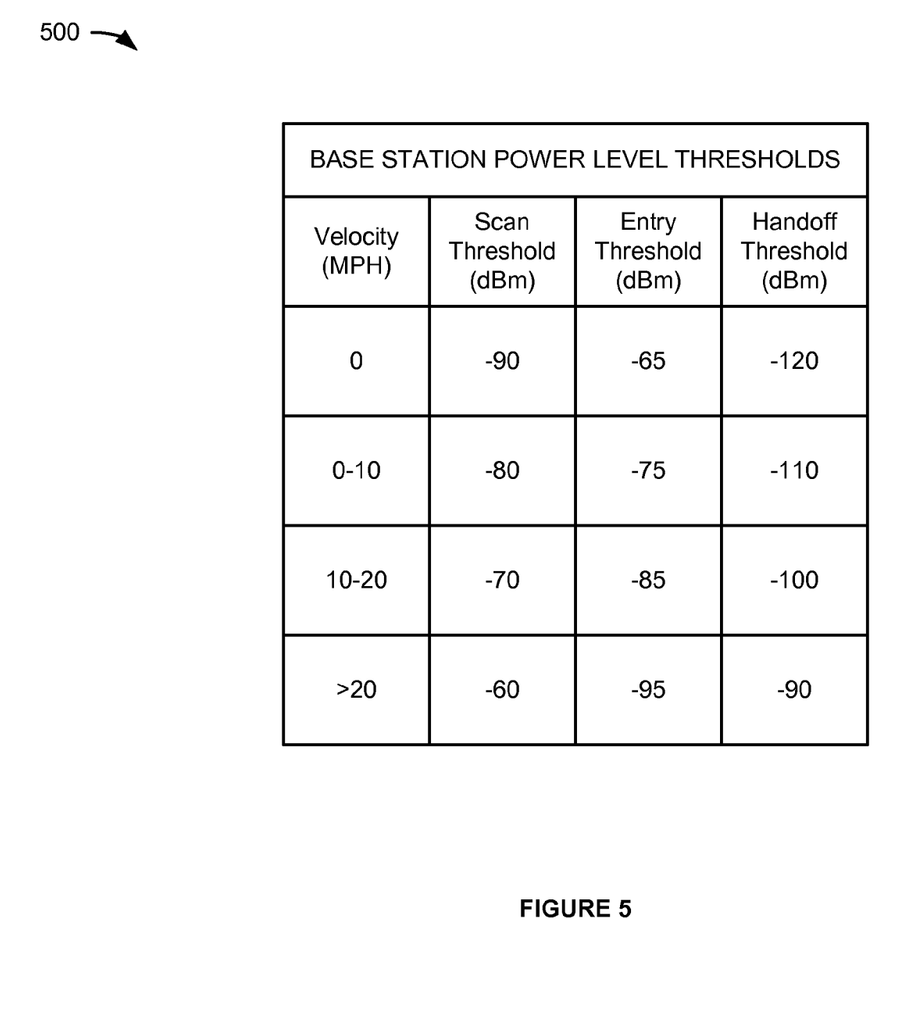
FIG. 5 illustrates a table with threshold power levels.

FIG. 5 illustrates table 500 that contains threshold power level values that wireless device 301 uses to compare received power levels from base stations 302-304. Table 500 may be stored on wireless device 301. The values in table 500 may pertain to the entire cellular network 305, a single base station, a wireless sector, a protocol type, or any other subset of cellular network 305. The first column of table 500 lists a velocity range. The next column to the right lists scan threshold power levels for each of the velocity ranges. Scan threshold power levels indicate whether wireless device 301 should scan for other base stations to which wireless device 301 may handoff. The next column lists entry threshold power levels for each of the velocity ranges. Entry power level thresholds indicate whether a base station detected when scanning should be entered as a candidate for a possible handoff. The last column lists handoff threshold power levels for each of the velocity ranges. Handoff threshold power levels indicate whether wireless device 301 should handoff to another base station.

The velocities and power levels are shown in miles per hour and decibels in relation to a milliwatt. However, the velocities and power levels may use other units. Likewise, the threshold values are exemplary and may be different from those shown in table 500. Additionally, table 500 may include more or fewer velocity ranges that may be narrower or wider than those shown along with corresponding threshold values.

Referring back to FIG. 4, wireless device 301 uses table 500 to perform step 402. Wireless device 301 references the scan threshold that corresponds to the velocity range that the current velocity of wireless device 301 falls into. For example, if wireless device 301 is moving at 16 MPH, then the scan threshold is −70 dBm. Table 500 provides lower scan threshold power levels as the velocities increase. The scan threshold levels increase because as wireless device 301 moves faster the sooner wireless device 301 may need to scan for alternative base stations. As wireless device 301 moves away from base station 302 the received power level from base station 302 will most likely decrease. Consequently, higher scan threshold power levels will cause wireless device 301 to scan for alternative base stations sooner at higher velocities.

If the received power level is greater than the scan threshold power level, then wireless device 301 does not begin to scan for alternative base stations (step 404). Instead, wireless device 301 continues to periodically determine a received power level from base station 302, determine a velocity of wireless device 301, and repeats the comparison of step 402 to determine whether wireless device 301 should scan for alternative base stations.

If the received power level is lower than the scan threshold power level (step 404), then wireless device 301 begins scanning for other base stations (step 406). In this example, base stations 303 and 304 produce wireless signals that are within range of wireless device 301. Wireless device 301 may receive the pilot signals from base stations 303 and 304. Wireless device 301 determines a received power level of the signals received from base stations 303 and 304. Additionally, wireless device 301 may again determine the velocity of wireless device 301. Alternatively, wireless device 301 may use a recent velocity of wireless device 301, such as the velocity of wireless device 301 that was used to perform step 402.

Wireless device 301 then compares the received power levels from base stations 303 and 304 to an entry threshold power level based on the velocity of wireless device 301 (step 408). If the received power level from one of the base stations is greater than the entry threshold power level, then wireless device 301 enters the base station into a candidate list for base station handoff (step 410). For example, if the velocity of wireless device 301 is 45 MPH, then wireless device 301 references table 500 to determine that the entry threshold at that velocity is −80 dBm. Therefore, if the received signal from either base station 303 has a power level above −80 dBm, then wireless device 301 will enter base station 303 into a list of potential base stations for handoff. Similarly, if the received signal from either base station 304 has a power level above −80 dBm, then wireless device 301 will enter base station 304 into a list of potential base stations for handoff.

The entry threshold power level column contains power levels that increase as the velocity increases. The entry threshold power levels increase with velocity because as the velocity of wireless device 301 increases wireless device 301 may need to detect base stations that are further away. Those distant base stations will come into range of wireless device 301 more quickly the faster wireless device 301 is moving. Base stations that are further away will typically provide wireless device 301 with lower received power level. Thus, the faster wireless device 301 moves, the lower the entry threshold power level should be in order to consider more distant base stations for handoff purposes.

When comparing the received power level from a base station to the corresponding entry threshold power level, wireless device 301 may want to determine and compare the power level of the base station multiple times. Multiple samples allow for wireless device 301 to confirm that the base station is an appropriate base station for handoff purposes. The multiple samples may have consistent power levels or may be increasing, which may indicate that wireless device 301 is getting closer to the base station and the base station is appropriate for entry as a handoff candidate. Also, the multiple samples have decreasing power levels, which may indicate that wireless device 301 is not getting closer to the base station and the base station is inappropriate for entry as a handoff candidate. Alternatively, the multiple samples may merely need to stay above the entry threshold value, regardless of whether the samples increase or decrease in power, in order to be entered as a candidate base station for handoff.

In this example, the candidate list is populated with both base stations 303 and 304 because wireless device 301 determined that the received power levels from base stations 303 and 304 are above the entry threshold power level. The list may also be populated with base stations that are not shown in FIG. 4.

After the base station candidate list is populated with at lease one candidate base station, wireless device 301 continues to determine a received power level for base station 302. Additionally, wireless device 301 may also determine the current velocity of wireless device 301 or use another recently determined velocity. Wireless device 301 compares the received power level from base station 302 to a handoff threshold power level based on the velocity of wireless device 301 (step 412). If the received power level is lower than the handoff threshold power level, wireless device 301 hands off communications from base station 302 (step 414).

For example, if wireless device 301 is still traveling at 45 MPH, then wireless device 301 references table 500 to determine that the handoff threshold power level is −90 dBm. If the received signal power level from base station 302 is lower than −90 dBm, then wireless device 301 hands off communications to a candidate base station. However, if the received signal power level from base station 302 is greater than −90 dBm, then wireless device 301 continues to communicate with base station 302. In that case, wireless device continues to determine received power levels from base station 302 and velocities of wireless device 301 to compare with the handoff threshold power level column of table 500. Wireless device 301 hands off to a candidate base station if at any time the received power level is lower than the corresponding handoff threshold power level.

In this example, since the candidate list contains both base stations 303 and 304, wireless device 301 must choose a base station for hand off. Wireless device 301 may choose a base station based on the greatest received power level from each base station in the list. Alternatively, a base station may be chosen based on geographic proximity to wireless device 301 or by using any other method of choosing a base station from the candidate list.

Figure 6:
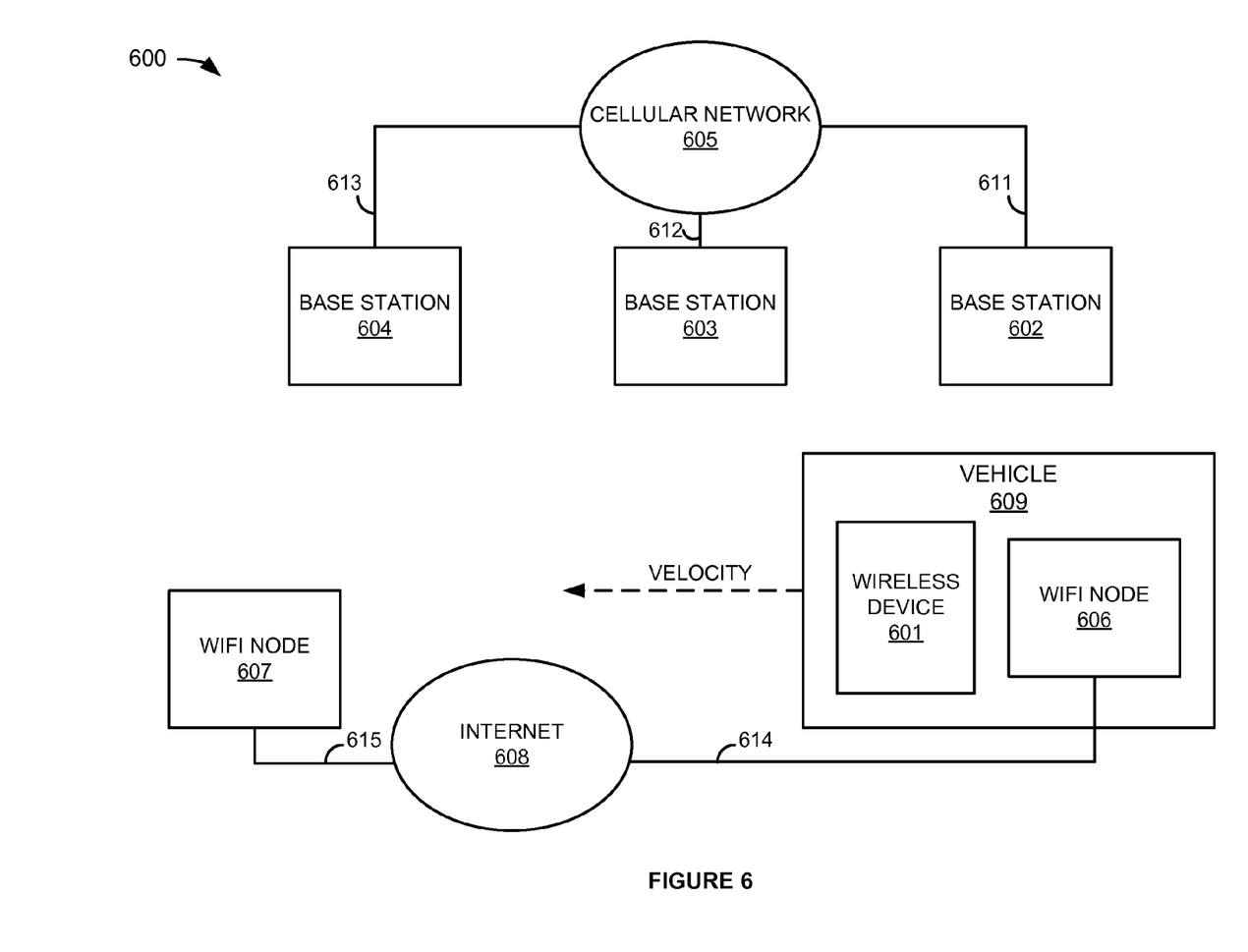
FIG. 6 illustrates a wireless communication system.

FIG. 6 illustrates wireless communication system 600. Wireless communication system 600 includes wireless communication device 601, base stations 602-604, cellular network 605, WiFi access nodes 606-607, and Internet 608. Wireless device 601 and WiFi access node 606 are located in vehicle 609, which may be a car, truck, train, bike, or any other type of transportation. Base stations 602-604 and cellular network 605 communicate over communication links 611-613, respectively. WiFi node 606 and Internet 608 communicate over wireless link 614. WiFi node 607 and Internet 608 communicate over communication link 615.

In operation, wireless communication system 600 performs similarly to wireless communication system 300. However, in this example, wireless device 601 is capable of communicating with cellular network 605 using the protocols of base stations 602-604 and is also capable of communicating with WiFi access nodes 606 and 607 using the WiFi communication protocol. Wireless device 601 may communicate using both protocols by using multiple wireless communication interfaces in wireless device 601. Wireless device 601 may use table 500 for all wireless access nodes independent of the protocol used to communicate with the wireless access node.

Figure 7:
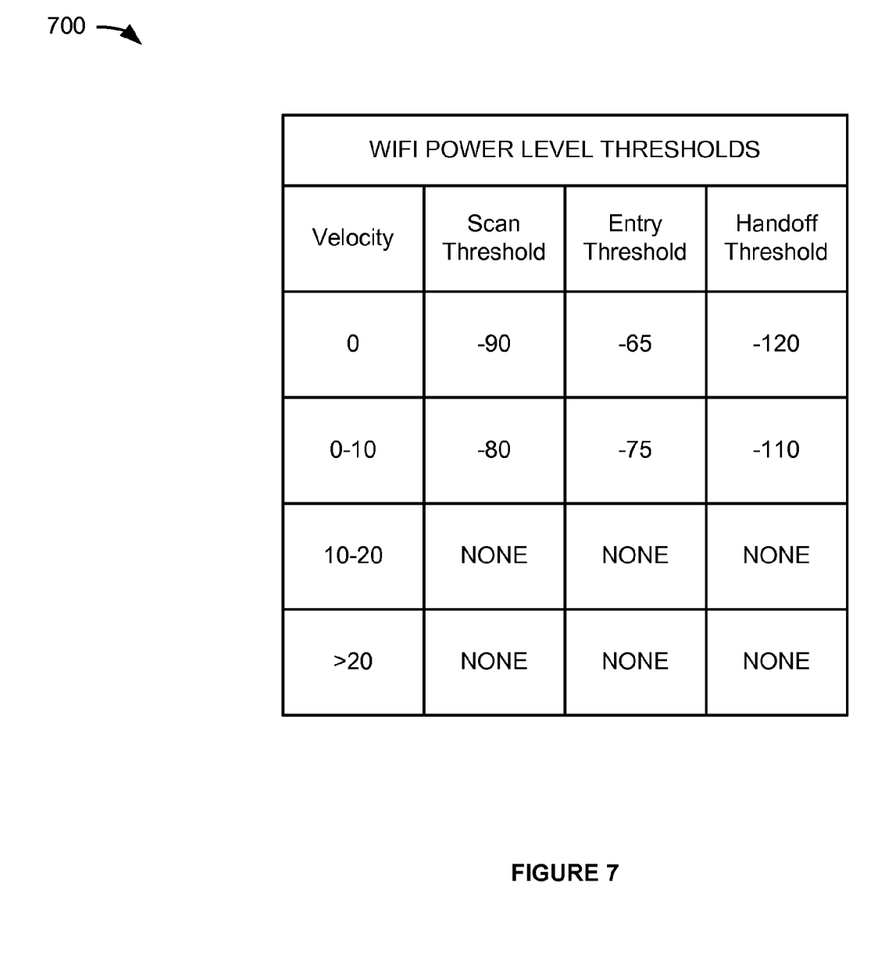
FIG. 7 illustrates a table with threshold power levels.

Alternatively, wireless device 601 may use a different table, such as table 700 shown in FIG. 7, for handoffs between Wifi access nodes 606 and 607 while still using table 500 for handoffs between base stations 602-604. Table 700 is similar to table 500 but in the velocity ranges above 10 MPH threshold power levels are not provided because wireless device 601 is not supposed to hand off between WiFi nodes when traveling above 10 MPH. As with table 500, the values shown in table 700 are exemplary and may be different in practice. Wireless device 601 is directed not to scan for or handoff between WiFi access nodes because wireless device 601 may be moving too fast for the typically short range of a WiFi access node. For example, if vehicle 609 is traveling by WiFi access nodes located in buildings along the route of vehicle 609, such as WiFi node 607, then wireless device 601 may try to hand of from WiFi node 606 even though WiFi node 606 is the better option because WiFi node 606 is located in vehicle 609 along with wireless device 601. However, in accordance with the process of FIG. 4, wireless device 601 will determine a velocity of wireless device 601 and reference table 700 to determine that at speeds above 10 MPH wireless device 601 should not handoff between WiFi nodes.

In some embodiments, the velocity of wireless device 601 may be a velocity relative to the velocity of an access node. The velocity of the access node may be determined in a way similar to that used to determine the velocity of wireless device 601. In this sense, the velocity of wireless device 601 when compared to WiFi node 607 may be greater than 10 MPH, thus, wireless device 601 references table 700 to determine that wireless device 601 should not handoff to WiFi node 607. However, vehicle 609 may carry multiple WiFi nodes other than WiFi node 606, as may be the case if vehicle 609 is a train. The velocity of wireless device 601 relative to access nodes on vehicle 609 is lower than 10 MPH, thus, wireless device 601 can handoff between the access nodes on vehicle 609 in accordance with table 700.

Figure 8:
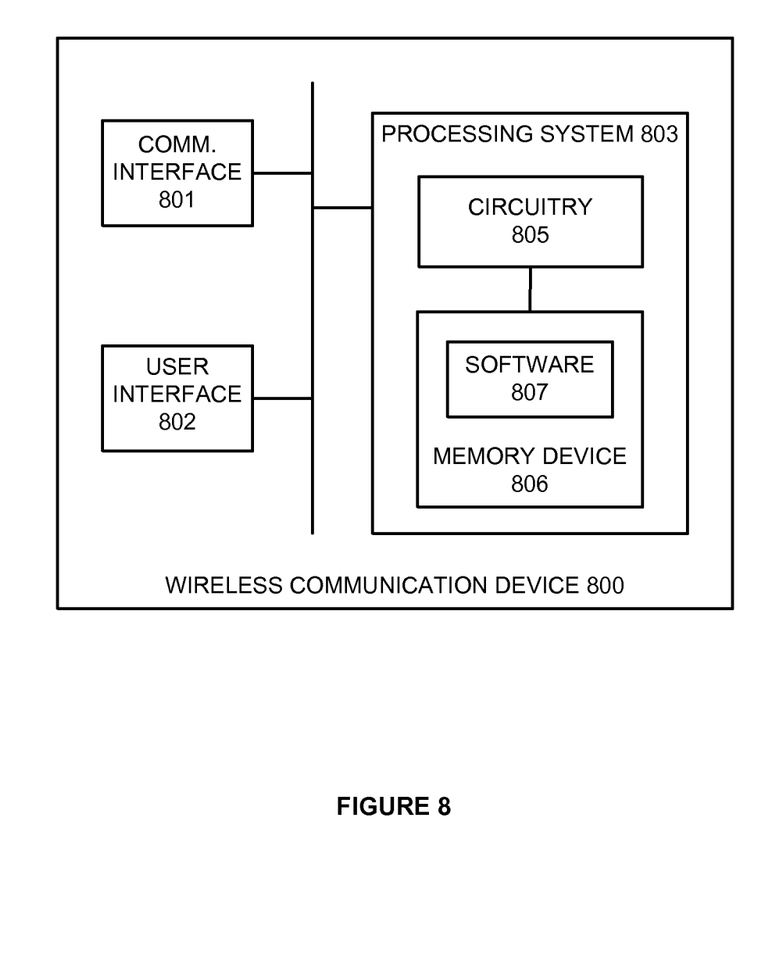
FIG. 8 illustrates a wireless communication device.

FIG. 8 illustrates wireless communication device 800. Wireless communication device 800 is an example of wireless communication devices 101 and 301, although devices 101 and 301 could use alternative configurations. Wireless communication device 800 comprises wireless communication interface 801, user interface 802, and processing system 803. Processing system 803 is linked to wireless communication interface 801 and user interface 802. Processing system 803 includes processing circuitry 805 and memory device 806 that stores operating software 807. Wireless communication device 801 may include other well-known components such as a battery and enclosure that are not shown for clarity. Wireless communication device 801 may be a telephone, computer, e-book, mobile Internet appliance, media player, game console, wireless network interface card, or some other wireless communication apparatus—including combinations thereof.

Wireless communication interface 801 comprises RF communication circuitry and an antenna. The RF communication circuitry typically includes an amplifier, filter, RF modulator, and signal processing circuitry. Wireless communication interface 801 may also include a memory device, software, processing circuitry, or some other communication device. Wireless communication interface 801 may use various protocols, such as CDMA, EVDO, WIMAX, GSM, LTE, WIFI, HSPA, or some other wireless communication format.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may omitted in some examples.

Processing circuitry 805 comprises microprocessor and other circuitry that retrieves and executes operating software 807 from memory device 806. Memory device 806 comprises a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 may include an operating system, utilities, drivers, network interfaces, applications, or some other type of software. When executed by processing circuitry 805, operating software 807 directs processing system 803 to operate wireless communication device 800 as described herein.

In particular, wireless communication interface 801 scans for a first wireless access node to determine a received power level for the first access node and, if the received power level is greater than a threshold power level, communication interface 801 exchanges communications with the first wireless access node. A power analysis software module within operating software 807 directs processing system 803 to compare the received power level to the threshold power level. A velocity software module directs processing system 803 to determine a velocity of the wireless communication device. A power control software module directs processing system to adjust the threshold power level based on the velocity. Additionally, wireless communication interface 801 scans for a second wireless access node to determine a second received power level for the second access node and, if the second received power level is greater than the adjusted threshold power level, communication interface 801 exchanges communications with the second wireless access node. The power analysis software module of operating software 807 directs processing system 803 to compare the second received power level to the adjusted threshold power level.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
    scanning for a first wireless access node to determine a received power level for the first access node;
    comparing the received power level to a threshold power level;
    if the received power level is greater than the threshold power level, exchanging communications with the first wireless access node;
    determining a velocity of the wireless communication device;
    adjusting the threshold power level based on the velocity;
    scanning for a second wireless access node to determine a second received power level for the second access node;
    comparing the second received power level to the adjusted threshold power level;
    if the second received power level is greater than the adjusted threshold power level, exchanging communications with the second wireless access node.

2. The method of claim 1 wherein adjusting the threshold power level comprises decreasing the threshold power level for an increase in the velocity.

3. The method of claim 1 wherein adjusting the threshold power level comprises increasing the threshold power level for a decrease in the velocity.

4. The method of claim 1 wherein adjusting the threshold power level comprises keeping the threshold power level constant if the velocity stays constant.

5. The method of claim 1 further comprising not scanning for the second wireless access node if the velocity is above a threshold velocity.

6. The method of claim 1 wherein the velocity is in relation to a velocity of the first wireless access node.

7. The method of claim 1 wherein the first wireless access node is part of a first wireless communication network and the second wireless access node is part of a second wireless communication network.

8. The method of claim 7 wherein the first wireless communication network is a cellular wireless network.

9. The method of claim 7 wherein the first wireless communication network is a wireless local area network.

10. The method of claim 1 wherein the velocity is determined using a global positioning system (GPS).

11. A wireless communication device comprising:
    a wireless communication interface configured to scan for a first wireless access node to determine a received power level for the first access node and, if the received power level is greater than a threshold power level, exchange communications with the first wireless access node;
    a processing system configured to compare the received power level to the threshold power level, determine a velocity of the wireless communication device, and adjust the threshold power level based on the velocity;
    the wireless communication interface configured to scan for a second wireless access node to determine a second received power level for the second access node and, if the second received power level is greater than the adjusted threshold power level, exchanging communications with the second wireless access node;
    the processing system further configured to compare the second received power level to the adjusted threshold power level.

12. The wireless communication device of claim 11 wherein the processing system is configured to adjust the threshold power level by decreasing the threshold power level for an increase in the velocity.

13. The wireless communication device of claim 11 wherein the processing system is configured to adjust the threshold power level by increasing the threshold power level for a decrease in the velocity.

14. The wireless communication device of claim 11 wherein the processing system is configured to adjust the threshold power level by keeping the threshold power level constant if the velocity stays constant.

15. The wireless communication device of claim 11 wherein the wireless communication interface is further configured to not scan for the second wireless access node if the velocity is above a threshold velocity.

16. The wireless communication device of claim 11 wherein the velocity is in relation to a velocity of the first wireless access node.

17. The wireless communication device of claim 11 wherein the first wireless access node is part of a first wireless communication network and the second wireless access node is part of a second wireless communication network.

18. The wireless communication device of claim 17 wherein the first wireless communication network is a cellular wireless network.

19. The wireless communication device of claim 17 wherein the first wireless communication network is a wireless local area network.

20. The wireless communication device of claim 11 wherein the processing system is configured to determine the velocity by using a global positioning system (GPS).

* * * * *